United States Patent
Falk et al.

(10) Patent No.: US 9,343,888 B2
(45) Date of Patent: May 17, 2016

(54) ARRANGEMENT AND METHOD FOR LOCKING AN AUTOMATIC REELING MECHANISM OF A CHARGING CABLE FOR AN ELECTRIC VEHICLE

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 239 days.

(21) Appl. No.: 14/114,267

(22) PCT Filed: Apr. 11, 2012

(86) PCT No.: PCT/EP2012/056505
§ 371 (c)(1),
(2), (4) Date: Oct. 28, 2013

(87) PCT Pub. No.: WO2012/146478
PCT Pub. Date: Nov. 1, 2012

(65) Prior Publication Data
US 2014/0048638 A1 Feb. 20, 2014

(30) Foreign Application Priority Data

Apr. 27, 2011 (DE) .......................... 10 2011 017570

(51) Int. Cl.
| | |
|---|---|
| *H02G 11/02* | (2006.01) |
| *B60L 11/18* | (2006.01) |
| *B65H 75/44* | (2006.01) |

(52) U.S. Cl.
CPC ............ *H02G 11/02* (2013.01); *B60L 11/1816* (2013.01); *B60L 11/1825* (2013.01);
(Continued)

(58) Field of Classification Search
CPC . H02G 11/02; H02G 11/003; B65H 2701/34; B65H 75/4431; Y02T 10/7005; Y02T 90/14; Y02T 10/7088; Y02T 90/12; B60L 11/1818; B60L 11/1816; B60L 11/1825; B60L 2230/10
See application file for complete search history.

(56) References Cited

U.S. PATENT DOCUMENTS

| | | | |
|---|---|---|---|
| 6,216,834 B1 | 4/2001 | Steinhovden | |
| 2010/0277127 A1* | 11/2010 | Flack ................. | B60L 11/1816 320/137 |
| 2012/0081073 A1 | 4/2012 | Niemann et al. | |

FOREIGN PATENT DOCUMENTS

| | | |
|---|---|---|
| CN | 101364653 | 2/2009 |
| DE | 20101983 | 6/2001 |

(Continued)

OTHER PUBLICATIONS

DE 20 2009 013 675 Mar. 17, 2011 (Machine translation of the description section).*

(Continued)

*Primary Examiner* — Mark Le
(74) *Attorney, Agent, or Firm* — Slayden Grubert Beard PLLC

(57) ABSTRACT

An automatic reeling mechanism for an electric vehicle or a charging post can automatically reel a charging cable and thus protect it against dirt and weather. In order to reduce mechanical loads and damage to the plug and minimize a risk for stumbling to a person, the automatic reeling mechanism is switched in a passive mode as long as a plug of the charging cable is plugged in and is not touched by a person. This is the case during the charging process. In this way, the automatic reeling mechanism can be comfortably used because no traction forces are active during the charging process and the charging cable can be laid out so that there is no risk of stumbling.

19 Claims, 2 Drawing Sheets

(52) U.S. Cl.
CPC ......... *B65H75/4421* (2013.01); *B60L 2230/12* (2013.01); *B65H 2701/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(56) References Cited

FOREIGN PATENT DOCUMENTS

| DE | 102007002025 | 7/2008 |
|----|--------------|--------|
| DE | 102009016895 | 10/2010 |
| DE | 102009045639 | 4/2011 |
| DE | 202009013675 | 4/2011 |

OTHER PUBLICATIONS

German Office Action for German Priority Patent Application No. 10 2011 017 570.9, issued Apr. 17, 2012, 6 pages.

English language International Search Report for PCT/EP2012/056505, mailed Aug. 21, 2013, 2 pages.

Chinese Office Action mailed Oct. 10, 2015 in corresponding Chinese Patent Application No. 201280020239.4, 7 pages.

* cited by examiner

ARRANGEMENT AND METHOD FOR LOCKING AN AUTOMATIC REELING MECHANISM OF A CHARGING CABLE FOR AN ELECTRIC VEHICLE

CROSS REFERENCE TO RELATED APPLICATIONS

This application is based on and hereby claims priority to International Application No. PCT/EP2012/056505 filed on Apr. 11, 2012 and German Application No. 10 2011 017 570.9 filed on Apr. 27, 2011, the contents of which are hereby incorporated by reference.

BACKGROUND

Electric vehicles need to be connected to a charging station for charging via a charging cable. The charging cable is often fixedly connected to the charging station and is only plugged in at the electric vehicle by an operator. Conversely, the charging cable can also be fixedly connected to the electric vehicle, in which case it is plugged in at the charging station. A charging cable with two loose ends which is removed from a trunk of an electric vehicle and is then inserted at both ends is also conceivable.

Such charging cables have a certain length in order to be able to produce a connection with the next charging station even in the case of electric vehicles which have been parked in an unfavorable location. The charging cables can be thin in a similar way to conventional electrical cables or can be relatively thick and rigid if the parameters of the charging method used (direct current/alternating current, level of the required charging current, etc.) require this.

In the case of conventional fuel pumps, an automatic mechanism is known which retracts the hose towards the pump. This automatic mechanism can be integrated in the pump or be implemented in the form of a suspension above the pump. If the hose is intended to be drawn out of the pump and possibly drawn further away from the pump when the vehicle tank opening is on the opposite side, an operator needs to pull with some force on the hose.

In the case of charging stations for electric vehicles, it is known to use a short charging cable. In this case, however, the electrical vehicle needs to be parked precisely in the correct location. Alternatively, it is known to use a long charging cable. However, this gets dirty when it is on the ground and needs to be wound and unwound by hand. The charging cable is, for example, suspended on a holder of the charging station or is transported in assembled form in the trunk. As long as the charging cable is resting on the ground, there is a risk of people tripping. Furthermore, helical charging cables are known which can be extended when pulled. The tensile stress on such cables recedes over time. Furthermore, helical cables can only be realized for relatively thin charging cables.

Moreover, cable drums are known for conventional electrical cables, with it being possible for a long cable to be wound onto said cable drums. An automatic reeling mechanism is also known, for example in vacuum cleaners, which makes it possible for an electrical cable to be withdrawn, wherein the electrical cable then remains in the corresponding position. For reeling, a pushbutton is actuated or the cable is pulled for a short period of time in order to release a lock and allow the cable to return.

For plugs of charging cables for electric vehicles, it is known to lock the plug mechanically during a charging operation so that it cannot be removed. This prevents unauthorized removal in the case of unintentional charging of a parked electric vehicle. The locking of the plug is coupled, for example, to a door lock of an electric vehicle or to a payment operation, as is disclosed in DE 10 2007 002025 or CN 101 36 46 53.

SUMMARY

One possible object is specifying an arrangement and a method for locking an automatic reeling mechanism of a charging cable for an electric vehicle which provide an alternative to the handling of the charging cable over the related art.

The inventors propose an arrangement which has an automatic reeling mechanism, which is designed for automatically reeling a charging cable for an electric vehicle. In this case, the charging cable can be drawn out of the automatic reeling mechanism by overcoming a retraction force which acts on a plug of the charging cable via the charging cable.

In addition, the arrangement comprises a control unit, which is designed to detect whether the plug is inserted or is no longer being touched by an operator. The control unit is also designed to reduce the retraction force or to decouple the retraction force from the plug as soon as the plug of the charging cable is inserted or is no longer being touched by the operator.

In the method, a charging cable is drawn out of an automatic reeling mechanism by an operator by overcoming a retraction force which acts on a plug of the charging cable via the charging cable. A control unit detects that the plug of the charging cable is inserted or is no longer being touched by the operator. The control unit thereupon reduces the retraction force or decouples said retraction force from the plug.

The arrangement and the method have the advantage that an automatic reeling mechanism for the charging cable is provided without the retraction force necessary for this pulling on the cable and the plug during charging of the electric vehicle. The plug of the charging cable is therefore not mechanically damaged by the corresponding tensile forces which may even act laterally. In addition to a mechanical loading of the plug, mechanical loading of a charging socket into which said plug is inserted is also avoided. The automatic reading mechanism makes it possible to grip merely the plug of the charging cable and not the charging cable itself. Since many charging stations are installed outdoors, the cable itself is subject to weathering and contamination. Owing to the automatic reeling mechanism, contamination of the charging cable can firstly be reduced since said charging cable is stored in protected fashion in the charging station or in the electric vehicle and is only withdrawn to the required length, with the result that the charging cable may not even come into contact with the ground. Since the operator does not need to grip the cable as a whole, but can merely draw the cable out at the plug, the operator also no longer touches the cable, as a result of which the risk of hands or clothing becoming dirty is reduced. In addition, the risk of tripping for the operator is reduced since the charging cable is now only drawn out to the required length.

By virtue of reducing or entirely decoupling the retraction force, the automatic reeling mechanism is a convenient way of facilitating use of the charging cable for the operator. Since the retraction force is reduced or entirely decoupled, the operator can release the plug during charging without even thinking about it without the plug being damaged. This is in any case a necessary precondition owing to the long charging operations for electric vehicles. In addition, the charging cable remains at the desired length as a result of the reduction in or decoupling of the retraction force. The operator can thus lay the charging cable on the floor also in a targeted manner such that there is no risk of tripping.

In accordance with an embodiment, the control unit has a signal input for a tactile detector, which is fitted on the plug and is in particular a pushbutton or a dynamometer or an inductive or capacitive tactile sensor. Alternatively, the control unit has a signal input for a plug-type connection detector, in particular a mechanical contact which is fitted on the plug and generates a signal when the plug is inserted. In a development, the automatic reeling mechanism has a spring, which is the cause of the retraction force and effects the automatic reeling of the charging cable. In addition, the arrangement comprises a locking apparatus, in particular a clamping apparatus which is driven by the control unit and which is designed for locking the charging cable and therefore for decoupling the retraction force from the plug. In an alternative development, the automatic reeling mechanism has an electric motor, which is driven by the control unit.

A charging station, an electric vehicle or a charging cable have the above-described arrangement.

In accordance with an embodiment of the method, the control unit detects that the plug of the charging cable is no longer inserted or is being touched by an operator again. Thereupon, the control unit increases the retraction force or couples this retraction force to the plug again.

In a development of the method, the control unit identifies that the plug is inserted on the basis of an internal resistance measurement between conductors of the charging cable, on the basis of a current measurement or on the basis of a data signal which is transmitted via the charging cable.

In accordance with an embodiment of the method, the control unit is programmed in order to unreel the charging cable by a predefined length as soon as the plug is inserted and is no longer being touched.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
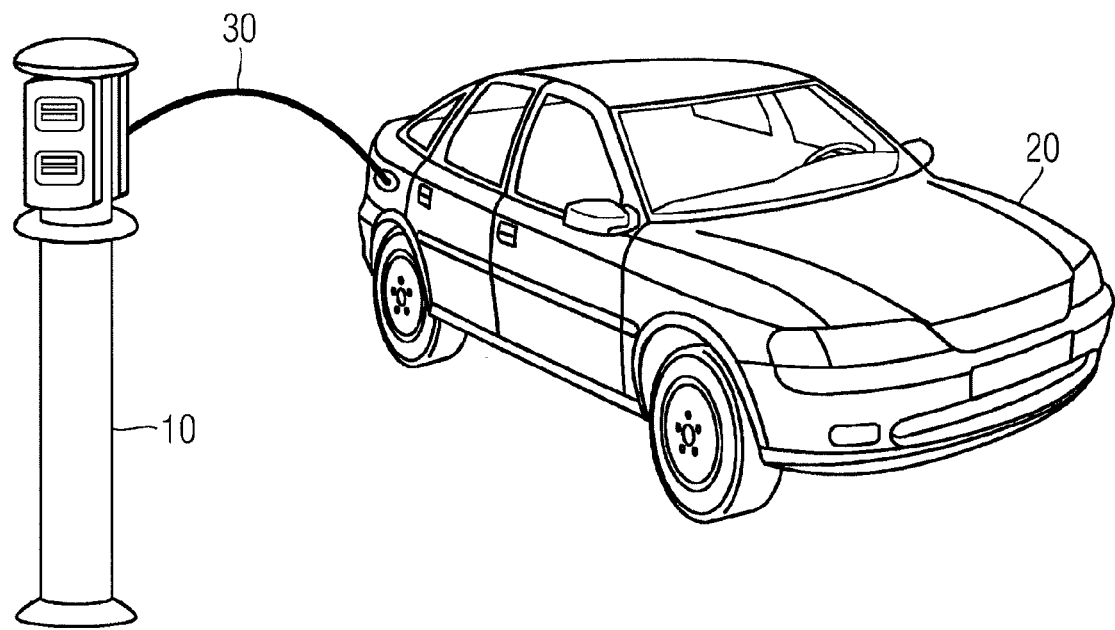
FIG. 1 shows an electric vehicle which is connected to a charging station with the aid of a charging cable.

Reference will now be made in detail to the preferred embodiments of the present invention, examples of which are illustrated in the accompanying drawings, wherein like reference numerals refer to like elements throughout.

FIG. 1 shows an electric vehicle 20, which is connected to a charging station 10 by a charging cable 30.

Figure 2:
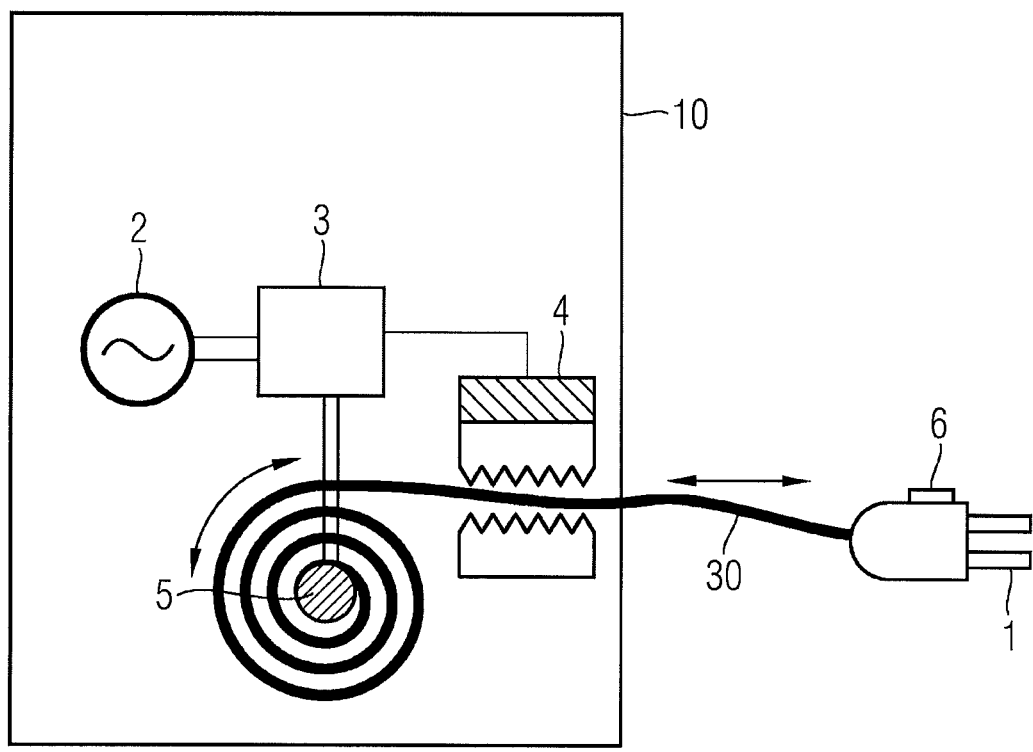
FIG. 2 shows an arrangement for locking an automatic reeling mechanism of a charging cable for an electric vehicle in accordance with an exemplary embodiment.

FIG. 2 shows a charging cable 30, which is wound up in a charging station 10, for example on a cable drum. An automatic reeling mechanism 5 applies a mechanical retraction force for reeling and retracting the charging cable 30 onto said automatic reeling mechanism, wherein the retraction force also acts on a plug 1 if an operator merely grips the plug 1 and not the charging cable 30.

In accordance with the present exemplary embodiment, the retraction force is modified irrespective of whether the plug 1 of the charging cable 30 is inserted (for example in a socket of an electric vehicle) or is no longer being touched by an operator. Then, the retraction force is decoupled from the withdrawn charging cable or the plug 1. This has the advantage that the charging cable 30 is kept at the present length while the plug 1 is inserted or is no longer being touched by the operator. This is the case precisely when the electric vehicle is being charged for a relatively long period of time. The advantage now relates to the fact that no retractive force acts on the plug 1 during this period of time which could mechanically damage the plug.

As soon as the operator grips the plug 1 again after the end of the charging operation and removes it from the counterpart station, the retraction force is activated by a control unit 3 again, whereupon the charging cable 30 is automatically wound up by the automatic reeling mechanism 5.

The automatic reeling mechanism 5 is implemented with the aid of a spring, for example, wherein the retraction force is a spring force. In order to decouple the retraction force from the plug 1, in this exemplary embodiment the charging cable 30 is locked mechanically by a clamping apparatus 4. The clamping apparatus 4 is, for example, a pneumatically, hydraulically or electromechanically movable cylinder, which is driven by the control unit 3.

In another variant, the automatic reeling mechanism 5 is implemented by an electric motor. The control unit 3 can adjust a torque or reeling moment or the retraction force which is generated by the electric motor by controlling a current intensity of a current which is present at the electric motor.

As soon as the control unit 3 identifies that the charging cable 30 has been inserted via the plug 1, said charging cable can adapt the torque or the retraction force of the electric moment and possibly also reduce it to zero. In one variant, the control unit 3 drives the electric motor in such a way that said electric motor unreels the charging cable 30 by a further length (for example 10 cm) once the plug 1 has been inserted or implements a forward and backward movement which indicates to the operator that the charging station 10 has identified the insertion of the plug 1 and has reduced or decoupled the retraction force. The operator can thereupon release the plug 1 and possibly lay the charging cable 30 on the ground in such a way that there is no risk of tripping.

The control unit 3 identifies that the operator is touching the plug 1 via a tactile detector 6, which is in the form of, for example, a pushbutton, a dynamometer or an inductive or capacitive sensor. Alternatively, the control unit 3 identifies that the plug 1 is inserted into a counterpart station, wherein, for this purpose, a mechanical contact, an internal resistance measurement of the electrical connection via the charging cable 30, a resistance measurement between conductors of the charging cable 30, a current measurement or a data signal which is transmitted via the charging cable 30 is evaluated.

The identification of the plug being inserted or the identification of an operator having released the plug 1 are two alternative exemplary embodiments which can also be combined with one another, however.

The control unit 3 is, for example, a microprocessor or an electrical circuit. Said control unit connects a current source 2 to the charging cable 30 for charging the electric vehicle once the plug 1 has been inserted.

As a deviation from FIG. 1, the automatic reeling mechanism 5 with the control unit 3 and possibly the clamping apparatus 4 does not need to be arranged in the charging station 10, but can also be installed in the electric vehicle. In addition, a charging cable which has a central piece in which said elements are arranged is also conceivable.

The mentioned exemplary embodiments, embodiments, developments and variants can be combined with one another freely.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device for a charging cable having a plug to be inserted in an electric vehicle or in a charging station, comprising:
   an automatic reeling mechanism to automatically reel the charging cable such that the charging cable can be drawn out of the automatic reeling mechanism by overcoming a retraction force which acts on the plug of the charging cable via the charging cable; and
   a control unit to:
      detect whether the plug of the charging cable is inserted or is no longer being touched by an operator, and
      at least reduce the retraction force as soon as the plug of the charging cable is inserted or is no longer being touched by the operator.

2. The device as claimed in claim 1, wherein
   the control unit has a signal input for a tactile detector, which is fitted on the plug, or
   the control unit has a signal input for a plug typo connection detector, which is fitted to the plug and generates a signal when the plug is inserted.

3. The device as claimed in claim 1, wherein
   the automatic reeling mechanism has a spring, which causes the retraction force and automatically reels the charging cable, and
   the device further comprises a clamping apparatus which is driven by the control unit to lock the charging cable and therefore decouple the retraction force from the plug.

4. The device as claimed in claim 1, wherein
   the automatic reeling mechanism has an electric motor, which is driven by the control unit.

5. The device as claimed in claim 1, wherein
   the control unit decouples the automatic reeling mechanism from the plug to eliminate the retraction as soon as the plug of the charging cable is inserted into the vehicle or is no longer being touched by the operator.

6. The device as claimed in claim 1, wherein
   the control unit detects whether the plug of the charging cable is inserted and detects whether the plug of the charging cable is no longer being touched by an operator, and
   the control unit at least reduces the retraction force as soon as the plug of the charging cable is inserted and the plug of the charging cable is no longer being touched by the operator.

7. The device as claimed in claim 1, wherein
   the control unit detects whether the plug of the charging cable is inserted, and
   the control unit at least reduces the retraction force as soon as the plug of the charging cable is inserted.

8. The device as claimed in claim 1, wherein
   the control unit detects whether the plug of the charging cable is no longer being touched by an operator, and
   the control unit at least reduces the retraction force as soon as the plug of the charging cable is no longer being touched by the operator.

9. A charging station, which has the device as claimed in claim 1.

10. An electric vehicle, which has the device as claimed in claim 1.

11. A charging cable apparatus comprising:
    a charging cable having a plug to be inserted in an electric vehicle or in a charging station;
    an automatic reeling mechanism to automatically reel the charging cable such that the charging cable can be drawn out of the automatic reeling mechanism by overcoming a retraction force which acts on the plug of the charging cable via the charging cable; and
    a control unit to:
       detect whether the plug of the charging cable is inserted or is no longer being touched by an operator, and
       at least reduce the retraction force as soon as the plug of the charging cable is inserted or is no longer being touched by the operator.

12. The charging cable apparatus as claimed in claim 11, wherein
    a tactile detector is fitted on the plug, and
    the control unit has a signal input for the tactile detector.

13. The charging cable apparatus as claimed in claim 12, wherein
    the tactile detector is a pushbutton tactile sensor, a dynamometer tactile sensor, an inductive tactile sensor or a capacitive tactile sensor.

14. The charging cable apparatus as claimed in claim 11, wherein
    a plug connection detector is fitted to the plug,
    the plug connection detector generates a signal when the plug is inserted, and
    the control unit has a signal input for the signal generated by the plug typo connection detector when the plug is inserted.

15. The charging cable apparatus as claimed in claim 14, wherein
    the plug connection detector is a mechanical contact.

16. A method for a charging cable having a plug to be inserted in an electric vehicle or in a charging station, comprising:
    automatically reeling the charging cable such that an operator draws the charging cable out of an automatic reeling mechanism by overcoming a retraction force, the retraction force acting on the plug of the charging cable via the charging cable;
    using a control unit to detect that the plug of the charging cable is inserted or is no longer being touched by the operator; and
    using the control unit to at least reduce the retraction force when the plug of the charging cable is inserted or is no longer being touched by the operator.

17. The method as claimed in claim 16, wherein
    the control unit detects when the plug of the charging cable is no longer inserted or detects that the plug of the charging cable is being touched again by the operator, and
    the control unit increases the retraction force when the plug of the charging cable is no longer inserted or the plug of the charging cable is being touched again by the operator.

18. The method as claimed in claim 16, wherein
    the control unit detects that the plug of the charging cable is inserted based on an internal resistance measurement between conductors of the charging cable, based on a current measurement or based on a data signal which is transmitted via the charging cable.

19. The method as claimed in claim 16, wherein the control unit unreels the charging cable by a predefined length as soon as the plug of the charging cable is inserted or is no longer being touched by the operator.

* * * * *